2 Sheets--Sheet 1.

M. G. FARMER.
Magneto-Electric Machine.

No. 161,874.

Patented April 13, 1875.

WITNESSES.
A. L. Hayes
S. M. Brooks

INVENTOR.
Moses G. Farmer

THE GRAPHIC CO. PHOTO-LITH. 39 & 41 PARK PLACE, N.Y.

2 Sheets--Sheet 2.

M. G. FARMER.
Magneto-Electric Machine.

No. 161,874. Patented April 13, 1875.

WITNESSES.
A. L. Hayes
S. M. Brooks

INVENTOR.
Moses G. Farmer.

THE GRAPHIC CO. PHOTO-LITH. 39 & 41 PARK PLACE, N.Y.

UNITED STATES PATENT OFFICE.

MOSES G. FARMER, OF SALEM, MASSACHUSETTS.

IMPROVEMENT IN MAGNETO-ELECTRIC MACHINES.

Specification forming part of Letters Patent No. 161,874, dated April 13, 1875; application filed June 21, 1873.

CASE B.

*To all whom it may concern:*

Be it known that I, MOSES G. FARMER, of Salem, in the county of Essex, State of Massachusetts, have invented a new and useful Improvement in Magneto-Electric Machines, of which the following is a full, clear, and exact description, reference being had to the drawings accompanying and forming part of this specification.

This invention consists of an improved magneto-electric machine, which I entitle a dynamo-electric machine, in which a stationary electro-magnet of cast-iron, between the poles of which an armature is made to rotate, is magnetized solely by currents induced in said armature during its rotation near said magnet, and thus by the action and reaction on each other of these constantly-augmenting currents a part of the actual energy of the prime mover is converted into magnetism, and a current of electricity of great power is generated.

The invention also consists in the construction and arrangement of the several parts of the machine in such a manner that it is durable, compact, and simple in construction.

Figure 2:
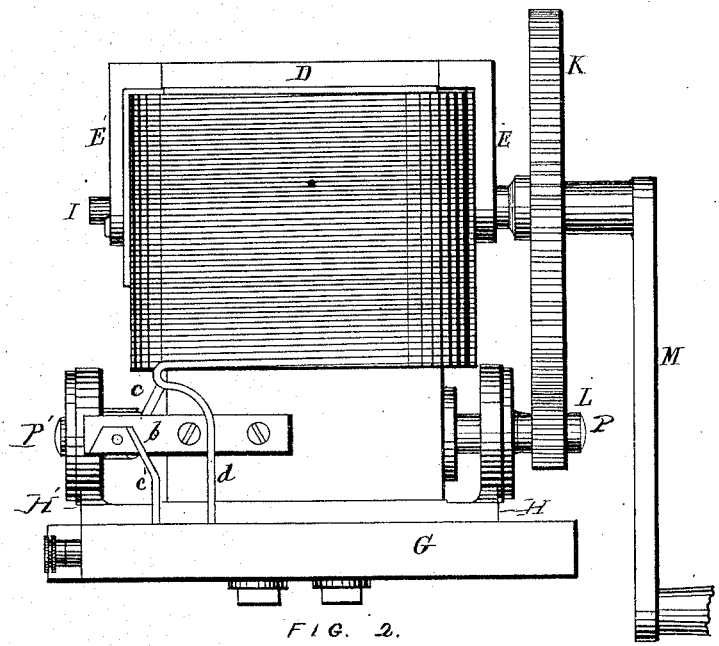
Figure 1:
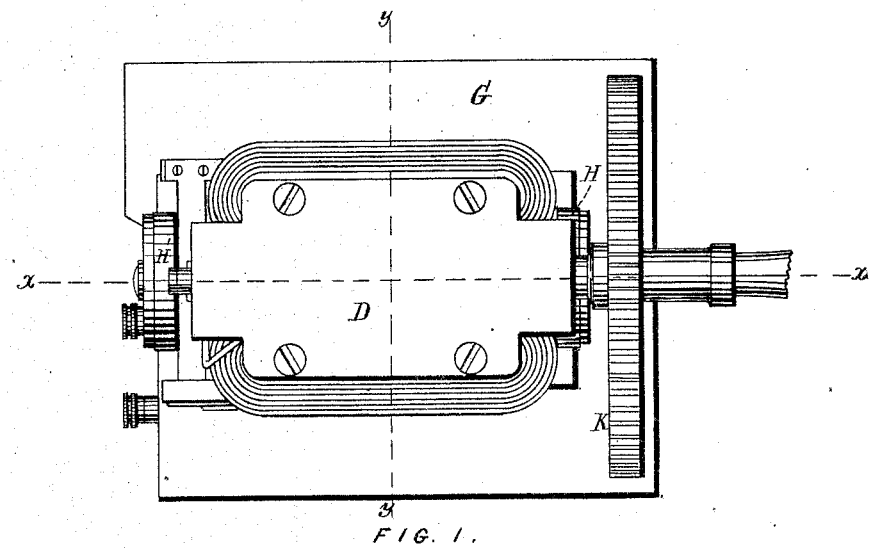
Figure 3:
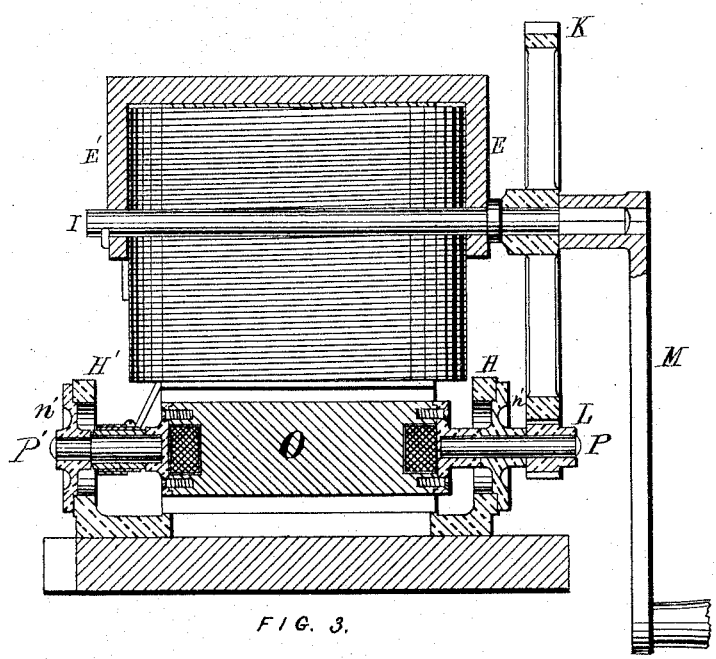
Figure 6:
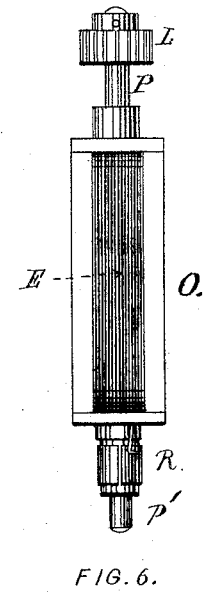
Figure 5:
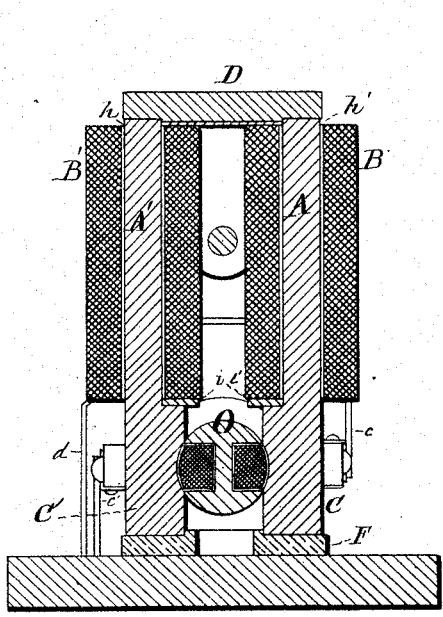
Figure 4:
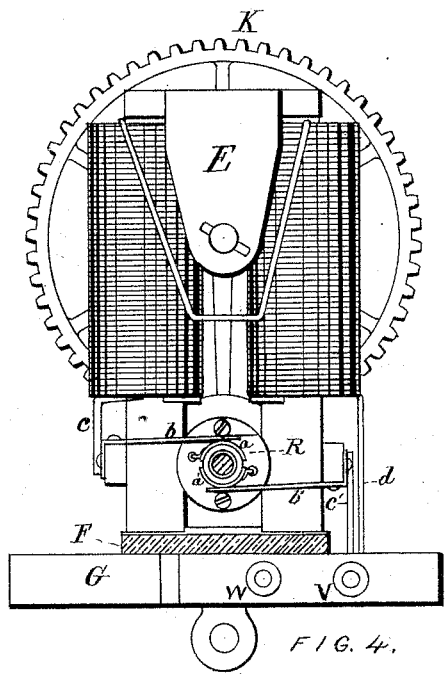

The accompanying drawings, forming part of this specification, represent my improved machine, Figure 1 being a plan view; Fig. 2, an end elevation; Fig. 3, a sectional view through the line $x\ x$, Fig. 1; Fig. 4, an end elevation; Fig. 5, a sectional view through the line $y\ y$, Fig. 1; and Fig. 6, a plan view of the rotating armature.

In these figures like letters refer to similar parts.

A A' are two flat plates of cast-iron, which stand side by side facing each other, and are connected at their upper extremities by a flat plate of cast-iron, D, which is attached by screws to the plates A A'. This plate D is provided with extensions or end pieces E E', at right angles thereto, and cast in the same piece therewith. The plates A A' are screwed at their lower ends to a brass plate, F, which is screwed to the wooden bed-plate of the machine. The upper portion of each of these plates A A' is wound with a coil of wire, and these coils are connected together in the usual manner, and are insulated from the plates A A' by a coating of paper, or some other suitable insulating material. These plates thus constitute an electro-magnet, between the poles of which the cylindrical armature O rotates. The lower portions C C' of the plates A A', which form the poles of the magnet, are thicker than the rest of the plates, and a part of the inner face of each of these plates is cut away, or hollowed out in the arc of a circle, so as to allow the cylindrical armature to be in close proximity thereto. O is the cylindrical armature. It is constructed on the plan of what is known as the Siemens's armature, and consists of a cylinder of soft iron, having a longitudinal groove on each side thereof, in which groove is wound a coil of wire. To each end of this armature a pivot, P P', is secured by means of a brass head, and by these pivots the armature rotates. The ends of these pivots bear in brass bushings, secured to the upright projections or lugs H H', which are cast in one piece with the plate F. By this plan of construction a true and accurate bearing is afforded for the pivots of the armature. The pivot P is provided at one extremity with a pinion-wheel, L, which engages with a cog-wheel, K, which cog-wheel is mounted upon a shaft, I, which bears in the end pieces E E', and is rotated by a crank, M.

On the rotation of this armature alternate currents of electricity are generated in it by magneto-induction, which alternate currents are converted into a continuous current in one direction by means of a commutator.

This commutator is represented at R, and is of the usual construction. It consists of ten semi-cylindrical plates of metal, $a'\ a'$, on opposite sides of a collar of some suitable insulating material, such as ivory, upon the shaft P, and insulated from each other and from the shaft. Each of these plates is connected to an end of the wire surrounding the armature, and on each of these semi-cylinders bear, on opposite sides, springs $b\ b'$, which springs are each attached to a wooden block, $h$, secured to the adjacent metallic plate. One of these springs, $b$, is connected by a wire, $c$, to one end of the coil surrounding the magnet, and the other, $b'$, is connected by a wire, $c'$, to one of the binding-screws V, from which it is led where it is to be used. The other binding-screw, W, is connected by a wire, $d$, to the extremity Z of the wire on the magnet. The currents generated in the armature O are thus caused to traverse the coils of the stationary electro-magnets B B'. During the rotation of the armature, when it is in the position represented in Fig. 4, the current flows from $a$ to $b$, and thence around the coils B B of the electro-magnet; but when the position of the armature is reversed, and $a'$ is in connection with $b$, the current in the armature is also reversed, and the current flows in the same direction as before around the coils B B'. The current generated in the armature being thus used to more strongly magnetize the electro-magnet, it, in its turn, induces stronger currents in the armature-wire, and thus action and reaction continue while the armature rotates, until a maximum is reached.

I prefer to use cast-iron instead of wrought-iron in construction of this machine, for the reason that it holds a larger amount of remanent or subpermanent magnetism, and therefore, after having been disused for a long time, will be more likely, when used again, to start into action quickly, than it would if made of wrought-iron. It is also less costly than wrought-iron.

I consider the use of cast-iron in the construction an important feature of invention.

What I claim as my invention, and desire to secure by Letters Patent of the United States, is—

1. A dynamo-electric machine, constructed substantially as set forth, in which the electromagnetic field is sustained solely by the magnetism produced by currents which, circulating in it, are evolved from the armature which rotates in this field.

2. The combination of the non-magnetic plate F, provided with lugs H H', having bushings $n$ $n'$ thereon, the pivots P P', the armature O, the plates A A', the coils B B', and the cross-piece D, substantially as and for the purpose set forth.

3. The combination of the cross-piece D, having lugs or ears E E' attached thereto, the shaft I, wheel K, the pinion L, pivot P, armature O, and commutator R, substantially as set forth.

4. The arrangement of the coils B B', armature O, segments $a$ $a'$ of the commutator-springs $b$ $b'$, screw-cups W V, connecting wires $c$ $c'$ $c''$ $d$, and the external wire connecting the screw-cups in one and the same electric circuit, substantially as set forth.

5. A dynamo-electric machine having the cores A A', and connecting cross-piece D of the electro-magnet, and the armature O, constructed of cast-iron, substantially as and for the purpose set forth.

MOSES G. FARMER.

Witnesses:
A. L. HAYES,
WM. A. HAYES, Jr.